Figure 1:
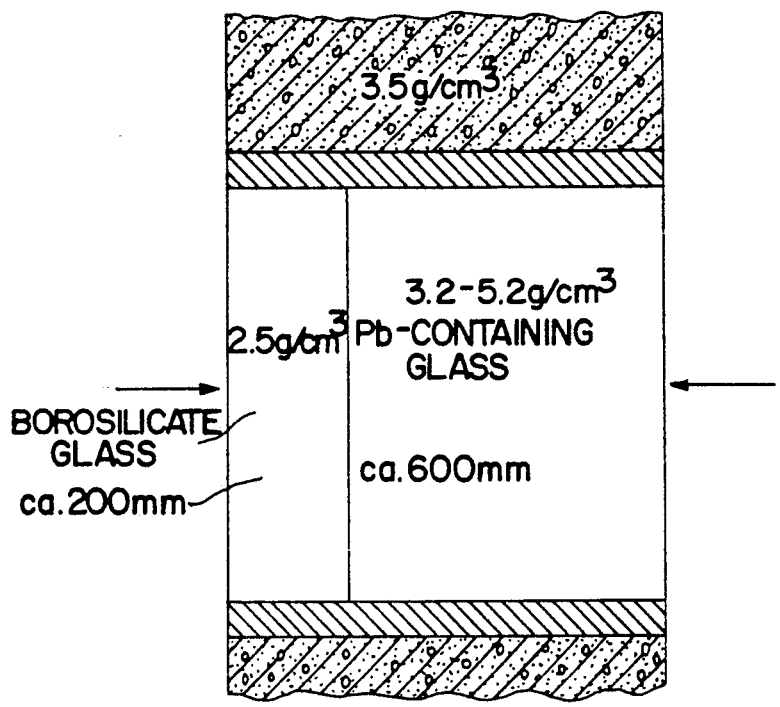

United States Patent [19]
Speit

[11] Patent Number: 5,073,524
[45] Date of Patent: Dec. 17, 1991

[54] RADIATION-SHIELDING GLASSES PROVIDING SAFETY AGAINST ELECTRICAL DISCHARGE AND BEING RESISTANT TO DISCOLORATION

[75] Inventor: Burkhard Speit, Mainz-Finthem, Fed. Rep. of Germany

[73] Assignee: Schott Glaswerke, Mainz, Fed. Rep. of Germany

[21] Appl. No.: 534,012

[22] Filed: Jun. 6, 1990

Related U.S. Application Data

[63] Continuation-in-part of Ser. No. 341,996, Apr. 24, 1989, abandoned, which is a continuation-in-part of Ser. No. 342,670, Apr. 2, 1989, abandoned, which is a continuation-in-part of Ser. No. 111,339, Oct. 22, 1987, abandoned.

[30] Foreign Application Priority Data

Oct. 22, 1986 [DE] Fed. Rep. of Germany ....... 3635834

[51] Int. Cl.$^5$ .............................................. C03C 3/102
[52] U.S. Cl. ......................................... 501/60; 501/56; 501/57; 501/58; 501/61; 501/64; 501/65; 501/74; 501/75; 501/78; 252/478
[58] Field of Search .................... 252/478; 501/60, 61, 501/64, 74, 75, 77, 78, 65, 56, 57, 58

[56] References Cited

U.S. PATENT DOCUMENTS 3,725,093 4/1973 Savner ........................... 252/478 X
4,174,490 11/1979 Van Erk et al. ................. 252/478 X
4,366,252 12/1982 Weaver ............................ 501/64 X
4,520,115 5/1985 Speit et al. ...................... 501/64 X Primary Examiner—Karl Group
Attorney, Agent, or Firm—Millen, White & Zelano

[57] ABSTRACT

Cerium-doped radiation-shielding glasses in the system of $SiO_2$-PbO-alkali metal oxides, with a high absorption coefficient for high-energy X-ray and/or gamma- and, respectively, neutron radiation which are resistant to discoloration and exhibit a discharge stability of $>5\times10^8$ rad, consist essentially of (in % by weight)

| | |
|---|---|
| $SiO_2$ | 35–56 |
| $Na_2O$ | |
| $K_2O$ | 12–21 |
| $Cs_2O$ | |
| $PbO_2$ | 24–46 |
| $CeO_2$ | 0.5–2.5 |
| $CuO + Fe_2$ | 0–0.05; | for absorption of neutrons, the isotope $Li^6$ can furthermore be onctained therein, and $SiO_2$ can be substituted by $B_2O_3$ and/or $Gd_2O_3$ in an amount of up to 10% by weight and $Gd_2O_3$ is present.

34 Claims, 3 Drawing Sheets

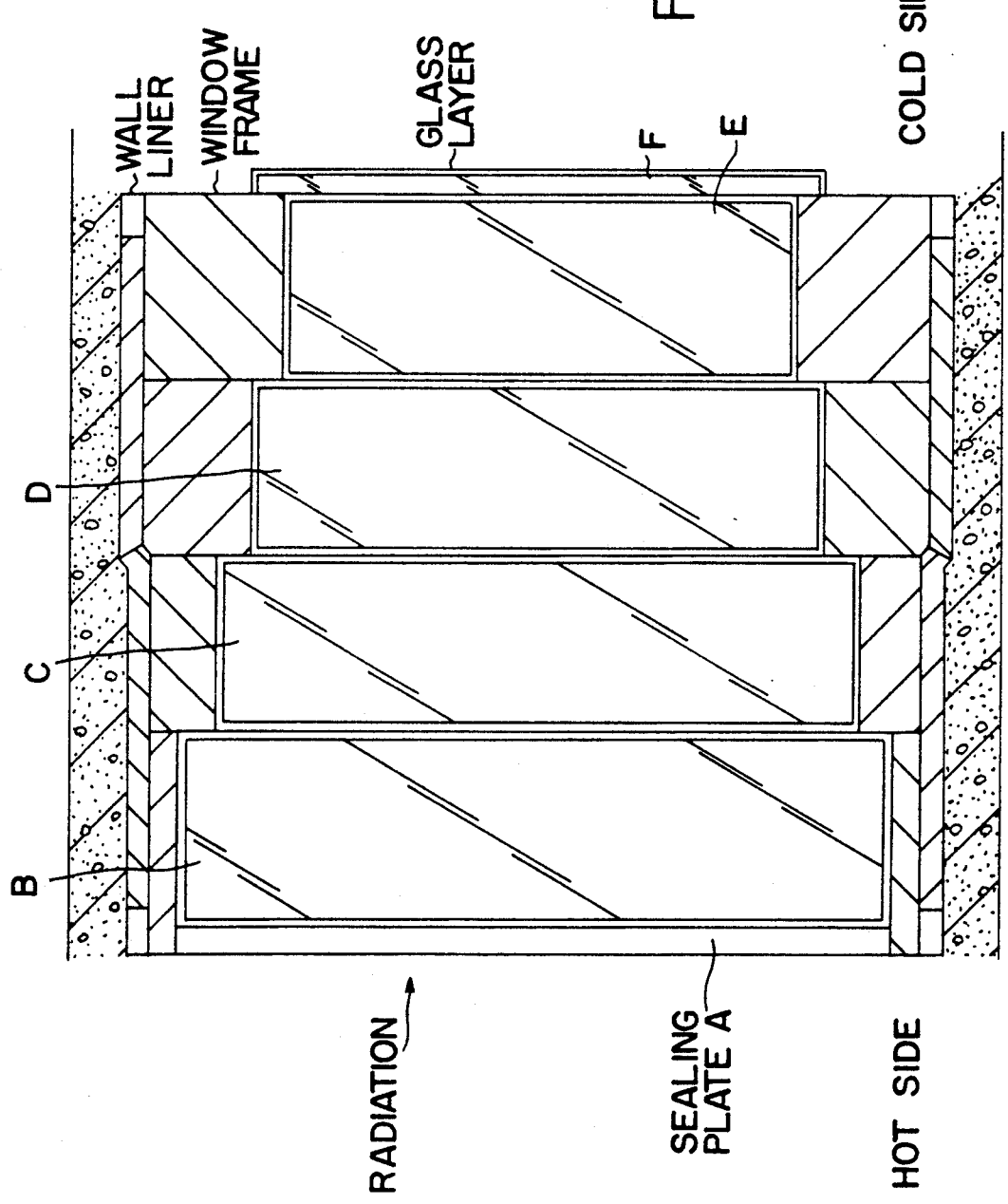

RADIATION-SHIELDING GLASSES PROVIDING SAFETY AGAINST ELECTRICAL DISCHARGE AND BEING RESISTANT TO DISCOLORATION

CROSS REFERENCE TO RELATED APPLICATIONS

This is a continuation-in-part of application Ser. No. 07/341,996 filed Apr. 24, 1989, now abandoned, which is a continuation-in-part of application Ser. No. 07/342,670 filed Apr. 2, 1989, now abandoned, all incorporated by reference herein, which is a file wrapper continuation-in-part of application Ser. No. 07/111,339 filed Oct. 22, 1987 now abandoned.

BACKGROUND OF THE INVENTION

This invention relates to cerium-doped radiation-shielding glasses in the $SiO_2$-PbO-alkali metal oxide system, and especially to such glasses having a high absorption coefficient for high-energy X-ray and/or gamma radiation as well as neutron radiation. Radiation resistance against discoloration is provided by the cerium oxide.

Radiation-shielding glasses are utilized in radiation-shielding windows employed in various facilities, e.g., research installations, employing or separating radioactive isotopes, and reprocessing plants. These windows, made of different radiation-shielding glasses, must satisfy certain requirements:

(a) shielding of radiation from the hot cells with respect to the observer in front of the window (biological protection) down to a legally determined minimal dose [mrem];

(b) maximally high transparency of the total window even with radiation exposure over a time period of several decades (radiation resistance);

(c) high stability of the glasses of the window against electrical discharge (discharge stability).

As for (a):

Using Pb glasses with 24–75% by weight of PbO, it is possible to construct windows for any type of application by a combination of various Pb glasses of different thicknesses so that biological protection can be ensured in every instance.

As for (b):

The transparency of a window made of several glass panes of different glasses depends on:

(1) transparency of individual panes,
(2) thickness of individual panes,
(3) light losses due to scattering on surfaces of the individual panes,
(4) number of panes affecting the interfaces in (3),
(5) radiation resistance of types of glasses used.

By selecting optically homogenous radiation-shielding glasses doped with $CeO_2$ against radiation discoloration, high transparency of a window can be ensured even after operating a hot cell over several decades. The radiation resistance of the glasses is customarily determined by irradiation tests with $Co^{60}$ at varying radiation doses. By reducing the number of individual panes and by surface refining of the panes by means of leaching processes, cementing of several panes into a compound pane, and application of antireflection coats to glass surfaces, light scattering losses on surfaces can be further reduced, and the transparency of the window can be even more increased.

As for (c):

The presently utilized radiation-shielding glasses with contents of Pb between 24% and 75% by weight from the major manufacturers of radiation-shielding glasses are safe from electrical discharge merely up to $5 \times 10^6$ rad, i.e., after this dose of ionizing radiation, a discharge (electrical discharge) is observed in accordance with the internationally conventional testing method of Eckels and Mingesz, described in the publications:

T. W. Eckels and D. P. Mingesz, Hot. Lab. Proceedings, Argonne Nat. Lab., 1970.

T. W. Eckels and D. P. Mingesz, Hot Lab. Proceedings, Argonne Nat. Lab., Proceedings of 18th Conference of Remote.

This testing method is carried out as follows:

A falling pin of 725 g is dropped in a sliding tube from a height of 38 mm onto a test cube (100 mm$^3$) irradiated immediately beforehand ($Co^{60}$). If this causes, during this procedure (a) a markedly visible blue flash and/or
(b) the quasi "frozen-in" flash in the glass, the so-called "Lichtenberg" figure, then the discharge limit is exceeded, and one speaks of an electrical discharge.

Due to the discharge, the glass is destroyed and is unusable because of the then missing transparency.

The discharge limit, with data regarding the dose [rad] and test radiation [$Co^{60}$], such as, for example, $5 \times 10^6$ [rad, $Co^{60}$], is determined starting with non-irradiated material, at constantly increasing doses and with interim discharge tests, and the material is characterized correspondingly.

Therefore, discharge resistance of $5 \times 10^6$ rad means that, with $Co^{60}$ irradiation below this dose, there cannot be initiation of electrical discharge by the aforedescribed impact test. Spontaneous discharges, i.e., discharge phenomena without any external influence, such as pressure or impact, are obtained only at higher doses of radiation.

Radiation-shielding glasses free of Pb and having a relatively low absorption capability with respect to X-ray and/or gamma radiation have advantageously a discharge stability of $> 10^{10}$ (rad). For this reason, these glasses—cerium-stabilized borosilicate glasses being the norm—are utilized in radiation-shielding windows of hot cells to protect the Pb glasses against electrostatic discharge. In this connection, they serve, on the one hand, as a protective window against pressure and impacts for the Pb-containing glasses arranged therebehind, and on the other hand as a moderator for the "hot" radiation. FIG. 1 illustrates the structure, in principle.

The primary requirement to be met by radiation-shielding windows is the maximally complete absorption of radiation in the window by the glass, or the glasses. In this context, the shielding effect of the borosilicate glass with a volume proportion of about ¼ is, however, less than 10% of the total absorption of the window. It can be seen therefrom how the design of the window is adversely affected by the "borosilicate glass" with respect to volume and weight of the window.

Conversely, U.S. Pat. No. 3,356,579 also discloses radiation-shielding glasses utilized as "single-component" glasses, as well as windows made of these glasses. These conventional, halogen-free glasses exhibit essentially the following composition (based on the batch in % by weight):

| | |
|---|---|
| SiO$_2$ | 41–50 |
| PbO | 30–36 |
| CeO$_2$ | 2.0–3.5 |
| K$_2$O | 16–21 |

These glasses are highly resistant against discoloration and discharge after gamma irradiation up to at least 10$^8$ Roentgen, but have unsatisfactory neutron absorption properties. They exhibit densities of between 3.1 and 3.5 g/cm$^3$ and, with a thickness of 1 inch (=2.54 cm), have an initial transmission of above 90% at approximately 550 nm.

British Patent 764,575 discloses a gamma ray absorptive glass comprising 17% to 25% K$_2$O, 35% to 50% SiO$_2$, 26% to 45% P$_5$O and 0.8% to 1.8% CaO$_2$. According to this reference lanthanides (didymiumoxid) should be avoided. There is no disclosure in the reference of the glasses having a high resistance to electric discharge or that such glasses would meet the radiation qualities needed to avoid electric discharges in the glass.

In the prior art radiation-shielding glasses, compounds such as BaO and also SrO are included because they are particularly absorptive of gamma radiation. Also, amounts of Na$_2$O over 4 wt % are used because of the improved fluxing qualities of the glass melt. Although other bivalent compounds, e.g., MgO, CaO, ZnO and CdO are used in prior glasses, these compounds were not removed in purifying the glasses because it was believed that these compounds could be tolerated. Also, glasses with a resistance to electrical discharge of greater than 5×10$^8$ rad were unknown and not producible from prior art glasses.

U.S. Pat. No. 4,520,115 discloses a glass composition for tube faces in cathode ray tubes. It is known that such glasses can contain, e.g., PbO for shielding properties against X-ray radiation, CeO$_2$ for a high resistance to discoloration and rare earths Gd to improve electron browning behavior. However, such glasses have only poorer transmission qualities which do not matter in cathode ray tube faces which have thicknesses of only about up to 1 inch. The transmission qualities of such glasses would in general be unsuitable in radiation shielding windows having greater thicknesses, for example, up to 1 meter, and in any case, over 30 mm.

SUMMARY OF THE INVENTION

It is an object of the present invention to provide radiation-shielding glasses absorbing gamma and X-ray radiation as well as neutron radiation, with a very high discharge resistance of >5×10$^8$ rad upon exposure to high-energy radiation, and with a discoloration resistance of much greater than 5×10$^8$ rad (Co$^{60}$ radiation).

Another object is to provide windows made from such glasses.

Upon further study of the specification and appended claims, further objects and advantages of this invention will become apparent to those skilled in the art.

To attain the objects of this invention, there are provided radiation-shielding glasses absorbing gamma and X-ray radiation and neutron radiation with a resistance to electrical discharge of >5×10$^8$ rad with respect to high-energy radiation in the glass system (quantitative data in % by weight) of:

| | |
|---|---|
| SiO$_2$ | 35–56 |
| PbO | 24–46 |

-continued

| | | |
|---|---|---|
| Li$_2$O | 0–2.5 | |
| Na$_2$O | 0–4 | |
| K$_2$O | 7–21 | Σ = 12–21 |
| Cs$_2$O | 0–5 | |
| CeO$_2$ | 0.5–2.5 | |
| CuO | | 0–0.05 |
| Fe$_2$O$_3$ | | | and for the absorption of neutrons, SiO$_2$ is replaced in the glasses in an amount of up to 10% by weight by B$_2$O$_3$ and/or Gd$_2$O$_3$ and Gd$_2$O$_3$ is also present.

The K$_2$O content is preferably equal to or greater than, on a percent by weight basis, 12.5, and preferably not less than 15.1, up to 21 and the sum of Na$_2$O+K$_2$O+Cs$_2$O is preferably 15.1 to 21.

In addition to the above components, according to one embodiment of the invention, the glass contains not more than 2.4% by weight of (Li$^6$)$_2$O.

Still further, the glasses can contain refining agents As$_2$O$_3$ and/or Sb$_2$O$_3$, halogens F and/or Cl, and sulfates in quantities of up to 0.5% by weight.

According to another aspect of the invention, radiation-shielding windows are provided wherein at least a part of at least one pane is made of the glasses of this invention.

Generally, there is incorporated into the glass about 2–10%, preferably 3–8% of the sum of B$_2$O$_3$ and Gd$_2$O$_3$. In general, the glass contains, bearing these limitations in mind, 1–10% B$_2$O$_3$ and/or 1–10% Gd$_2$O$_3$, with the preferred quantities being 2–7.00% B$_2$O$_3$ and/or 2–7.50% Gd$_2$O$_3$. In a preferred embodiment, the Gd$_2$O$_3$ content is preferably at lest 10 ppm, more preferably from about 0.001 to 1.5 wt %, most preferably from about 0.004 to 0.25 wt %.

The lower the amount of SiO$_2$ in the glass, the higher the amount of the sum of B$_2$O$_3$ and Gd$_2$O$_3$ which is required, but at least 35% SiO$_2$ must be present.

In a preferred embodiment, the total content of the Na$_2$O, K$_2$O and Cs$_2$O is from about 15.1 to 21 wt %. The glass is also free from MgO, CaO, SrO, BaO, ZnO, CdO, and preferably also free of Al$_2$O$_3$. It is also preferred that the Na$_2$O content is not more than 4 wt %.

It has surprisingly been found that the absence of MgO, CaO, SrO, BaO, ZnO and CdO and also preferably Al$_2$O$_3$ leads to a radiation-shielding glass having good transmission qualities and the highest known resistance to electric discharge. It has been found that if only minimal amounts of such bivalent compounds are in the glasses, the preferred high resistance to electric discharge was not obtainable. It was further found that BaO and SrO which are normally present in radiation-shielding glasses reduce the transmission of the glasses to an unsuitable value. It was further found that even small amounts of Al$_2$O$_3$ lead to tiny stones in the glass because the solubility of Al$_2$O$_3$ in the glass melt appears to be very poor. If small amounts of Al$_2$O$_3$ are in the glass melt, the melting temperature must be raised from 1,400° to about 1,550° to get a clear glass melt. However, such a high melting temperature is undesirable; consequently, the radiation-shielding glasses are preferably free of Al$_2$O$_3$. The glasses made according to the present invention are particularly suitable for radiation-shielding glasses needed in thicknesses of from about 30 to 1,200 mm.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the preceding text and the following examples, all temperatures are set forth uncorrected in degrees Celsius and all parts and percentages are by weight, unless otherwise indicated.

Exemplary compositions according to the invention (in % by weight) and several properties are compiled in Table 1.

The discharge resistance and radiation resistance of the glasses were tested at the nuclear research facility Jülich (KFA) with the gamma spectrum of burnt burner elements, and in the nuclear research facility Karlsruhe (KfK) with the gamma radiation emitted by the isotope $Co^{60}$.

It was surprising, in this connection, that with the addition of the components responsible for neutron absorption, $B_2O_3$ and/or $Gd_2O_3$ and, respectively, $(Li^6)_2O$, the excellent properties of the radiation-shielding glass described in U.S. Pat. No. 3,356,579 remain preserved. It is also possible to attain a discharge stability of $>5\times10^8$ rad, whereas the gamma-ray-absorbing, conventional glasses are disclosed as being stable against electrical discharge to only about $1\times10^8$ rad.

TABLE 1

|  | 1 | 2 | 3 | 4 | 5 | 6 | 7 | 8 | 9 | 10 |
|---|---|---|---|---|---|---|---|---|---|---|
| $SiO_2$ | 53.80 | 44.85 | 49.20 | 48.60 | 47.20 | 36.70 | 42.00 | 36.65 | 42.30 | 43.90 |
| $PbO$ | 24.20 | 33.05 | 27.80 | 24.20 | 27.80 | 33.10 | 33.10 | 33.10 | 30.90 | 33.10 |
| $Li_2O$ | — | 0.30 | 0.30 | — | 0.30 | 0.50 | 0.30 | — | 0.30 | 0.30 |
| $Na_2O$ | 1.20 | — | 0.60 | — | 0.60 | — | — | — | — | 0.70 |
| $K_2O$ | 14.60 | 17.80 | 15.10 | 18.10 | 15.10 | 18.30 | 17.80 | 18.30 | 17.80 | 17.80 |
| $Fe_2O_3$ | — | — | 0.001 | — | 0.001 | 0.001 | — | 0.05 | — | — |
| $As_2O_3$ | — | — | 0.15 | — | 0.15 | 0.30 | — | 0.30 | — | — |
| F | — | 0.20 | 0.20 | 0.20 | 0.20 | 0.20 | 0.20 | 0.20 | 0.20 | 0.20 |
| $CeO_2$ | 1.80 | 1.80 | 1.40 | 1.40 | 1.40 | 0.90 | 1.60 | 1.40 | 1.50 | 1.00 |
| $Gd_2O_3$ | — | 2.00 | 5.25 | 7.50 | 5.25 | 10.00 | 2.00 | — | 2.00 | — |
| $B_2O_3$ | 2.00 | — | — | — | 2.00 | — | 3.00 | 10.00 | 5.00 | 3.00 |
| $(Li\text{-}6)_2O$ | 2.40 | — | — | — | — | — | — | — | — | — |
| $\rho[g/cm^3]$ | 3.04 | 3.33 | 3.21 | 3.12 | 3.22 | 3.52 | 3.34 | 3.35 | 3.24 | 3.28 |
| $Tg$ [°C.] | 543 | 512 | 554 | 562 | 541 | 535 | 509 | 501 | 514 | 508 |
| T 450 nm 5 mm | 71.5 | 65.3 | 67.1 | 68.5 | 64.8 | 63.2 | 66.4 | 69.8 | 66.5 | 69.6 |
| T after $5\times10^8$ rad | 38.5 | 45.9 | 43.2 | 44.5 | 47.4 | 45.6 | 48.0 | 36.3 | 46.6 | 37.5 |
| Discharge | no discharge up to $5\times10^8$ rad ||||||||||

With the glasses of this invention, windows can be built that are less complicated in their structure. It is possible to obtain a higher transmission by reducing the thickness of the windows while retaining the permissible radiation threshold values on the cold side.

The radiation windows according to this invention may have multiple layers of glass, e.g., 2 or more, preferably 2 to 8 layers, wherein at least one layer is or comprises the glass according to this invention.

Figures 2A, 2B:
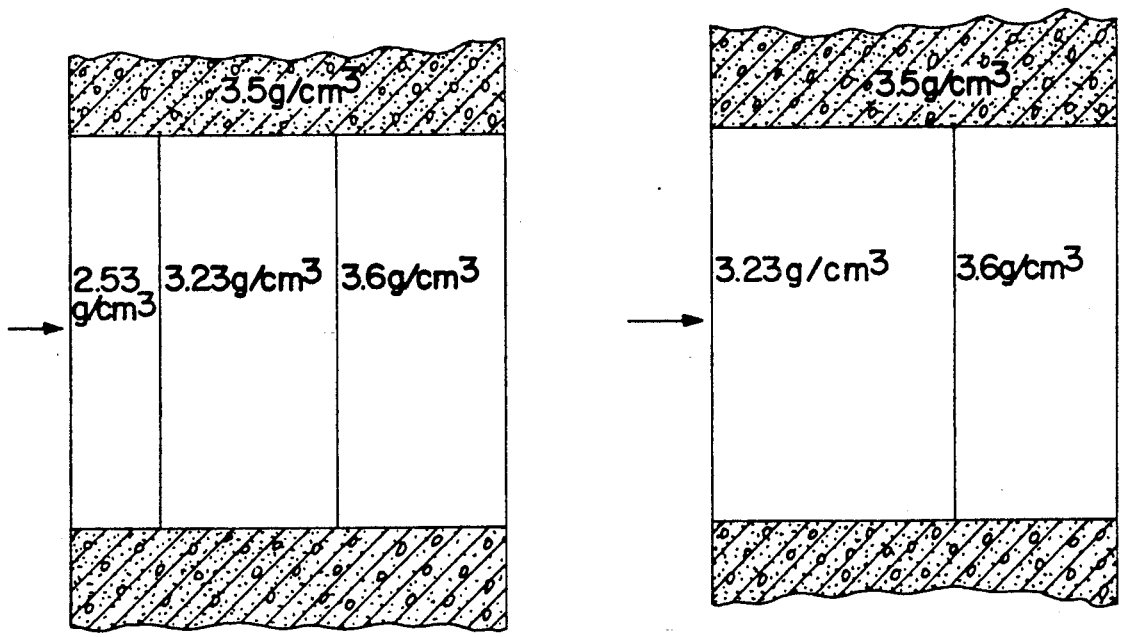
Figure 3A:
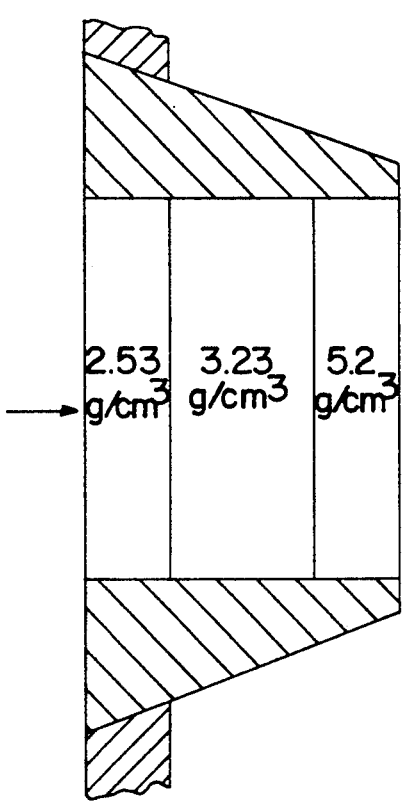
Figure 3B:
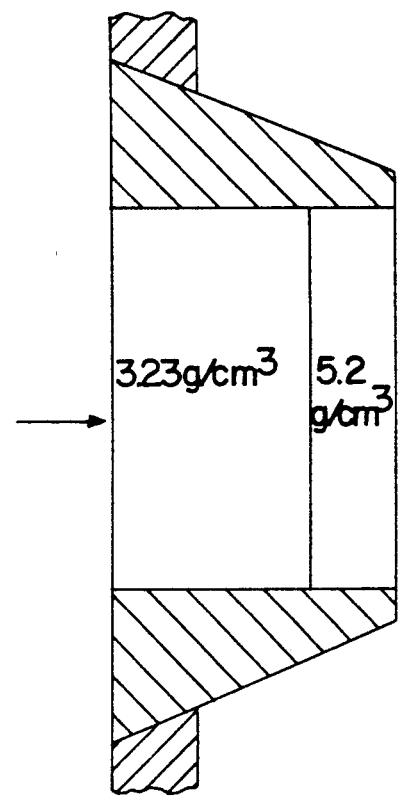

This will be demonstrated by way of example, using FIGS. 2a, b and 3a, b and 4 and the subsequently disclosed Tables 2, 3 and 4. The windows according to FIGS. 2a and 3a are made of commercially available glasses, whereas the glasses of this invention are used in the windows according to FIGS. 2b and 3b. In both examples, the two glasses having the densities of $\delta=2.53$ g/cm$^3$ and $\delta=3.23$ g/cm$^3$ are substituted by a single glass having a density of $\delta=3.23$ g/cm$^3$.

TABLE 2

| Source: | $Co^{60}$ |
|---|---|
| Activity: | $10^4$ Ci |
| Dose rate, "hot" side: | $2.6\times10^5$ rad/h |
| Maximally permissible dose rate, "cold" side: | $2.5\times10^{-3}$ rad/h |
| Wall: | concrete, density 3.5 g/cm$^3$ |

|  | Window 2a | Window 2b |
|---|---|---|
| Discharge stability (rad) | $>10^6$ | $>5\times10^8$ |
| Thickness (mm) | 970 | 930 |
| Transmission, 589 nm (%) | 52 | 56 |
| Dose rate, "cold" side (rad/h) | $2.1\times10^3$ | $1.8\times10^{-3}$ |

TABLE 3

| Source: | $Cs^{137}$ |
|---|---|
| Activity: | $10^4$ Ci |
| Dose rate, "hot" side: | $6.7\times10^5$ rad/h |
| Maximally permissible dose rate, "cold" side: | $3.5\times10^{-3}$ rad/h |
| Wall: | Pb of a density of 11.4 g/cm$^3$ |

|  | Window 3a | Window 3b |
|---|---|---|
| Discharge stability (rad) | $>10^6$ | $>5\times10^8$ |
| Thickness (mm) | 730 | 660 |
| Transmission, 589 nm (%) | 60 | 64 |
| Dose rate, "cold" side (rad/h) | $1.3\times10^{-3}$ | $1.3\times10^{-3}$ |

These exemplary window constructions do not restrict the broad range of usage of the glasses according to the composition range claimed.

The installation of the windows into Pb walls represents, with the use of the glasses according to this invention, a substantial simplification in the structural design of the windows and of the window frames.

The roughly sketched structure of a Pb-wall window (FIG. 3) clarifies the complexity of the mounting or frame structure of the window construction which seems to be of excessive dimensions with respect to the Pb wall but is necessary for the shielding effect. Essential advantages for a simpler window design would already ensue in this case with a saving of glass of >10 volume percent (see FIGS. 3a and 3b) by elimination of the Pb-free glass proportion and by using the glasses of this invention. On account of these matters, these windows not only satisfy the three primary requirements for radiation-shielding windows:

(a) biological protection,
(b) transparency, radiation resistance, and
(c) discharge stability, but, with a substantially lesser use of glass, even improve the transparency and the viewing angle of the window. The latter, with a larger field of view, results in improved monitoring of a "hot" cell.

FIG. 4 describes an embodiment of the invention wherein the radiation window comprises 6 layers A-F. At least one of the layers A-D comprises the glass according to this invention. The wall liner is preferably steel built into a concrete wall, and the window frame is, e.g., cast steel or cast iron. Table 4 discusses the physical properties of the radiation shielding (RS) glasses, wherein the first number refers to the density, and the G number refers to the $CeO_2$ content.

A-D has the composition of the glass according to this invention.

Layer A: A glass according to this invention, or another stabilized glass, e.g., RS 253—G 18 or RS 253—G 25;

Layer B: A glass according to this invention or another stabilized glass, e.g., RS-253 G 18 or RS 253—G 25;

Layer C: A glass according to this invention or another stabilized glass, e.g., RS 323 G 15;

Layer D: A glass according to this invention or another stabilized glass, e.g., RS 323—G 15;

Layer E: A stabilized glass, e.g., RS 520—G 05, or a nonstabilized glass, e.g., RS 323, RS 360, or RS 520;

Layer F: A stabilized glass, RS 323—G 19, or a nonstabilized glass, e.g., RS 253 or any other suitable glass or plastic glass.

Preferably, the glass layer A is easily exchangeably

TABLE 4

| | Physical Properties of RS | | | | | | | | |
|---|---|---|---|---|---|---|---|---|---|
| | Stabilized Glasses | | | | | | Nonstabilized Glasses | | |
| Glasses RS | 253-G18 | 253-G25 | 323-G15 | 323-G19 | 420-G07 | S20-G05 | 253 | 360 | 520 |
| Density ($g/cm^3$) | 2.53 | 2.53 | 3.23 | 3.23 | 4.20 | 5.20 | 2.53 | 3.60 | 5.20 |
| CeO2-content (weight %) | 1.8 | 2.5 | 1.5 | 1.9 | 0.7 | 0.5 | — | — | — |
| PbO-content (weight %) | — | — | 34 | 33 | 58 | 71 | — | 45 | 71 |
| Radiation resistance (Dose) for Ti | $10^8$Gy | $>10^8$Gy | $>5 \times 10^6$Gy | $10^7$Gy | $10^6$Gy | $5 \times 10^6$Gy | $10^3$Gy | $10^3$Gy | $10^3$Gy |
| Radiation resistance (Dose) for electrical discharge | $>10^8$Gy | $>10^8$Gy | $5 \times 10^4$Gy | $10^8$Gy | $2 \times 10^4$Gy | $2 \times 10^4$Gy | — | — | — |

1 Gy (Gray) = 100 rad

The approximate weight composition of some of the RS layers set forth in the table are given below:

| (a) RS-253-G18 | 70% $SiO_2$ |
| | 10% $B_2O_3$ |
| | 9% $K_2O$ |
| | 8% $Na_2O$ |
| | 1% BaO |
| | 2% $CeO_2$ |
| (b) RS-360 (F2) | 45% $SiO_2$ |
| | 9% $K_2O + Na_2O$ |
| | 45% PbO |
| (c) RS 520 (SF6) | 27% $SiO_2$ |
| | 71% PbO |
| | 2% $Na_2O + K_2O$ |

The areas of the glass layers can, if desired, telescopically decrease, with the layer at the radiation side having the greatest area.

The thickness of the layers B to E of the glass of the invention is at least 20 mm to 1200 mm, preferably 150 to 500 mm, most preferably 200 to 250 mm. The thickness of the total window (all layers) is about that of the wall or more. The area of layers A to F is at least about 100 mm×100 mm to 1700 mm×1700 mm, preferably 600 mm×500 mm to about 1200 mm×1200 mm. The ratio of the edges is about 1:1 to 1:2, preferably about 1:1.

The thickness of the concrete wall is, e.g., at least about 600 mm to 1800 mm; the thickness of a Pb wall is at least about 100 mm to 400 mm.

The glasses in the figure have, e.g., the following composition, with the proviso that at least one of layers arranged because the high radiation causes high aging (electrical discharge) of the first window. Also, the last layer (F) may be easily exchangeably arranged because there might be mechanical damage. The layer F is a protection layer for layer E (e.g., RS 250), because the glasses used are less resistant against chemical or mechanical attack. The thickness of layer A is at least about 15 mm to 50 mm, preferably about 20 mm. The thickness of layer F is at least about 3 mm to 25 mm.

| Practical Example for 10 kg of Glass | |
|---|---|
| Quartz powder | 43,960 g |
| Minium, $Pb_3O_4$ | 33,920 g |
| Lithium carbonate | 750 g |
| Potassium carbonate | 25,880 g |
| Sodium carbonate | 1,210 g |
| Potassium bifluoride | 400 g |
| Cerium(IV) oxide | 1,005 g |
| Boric acid ($H_3BO_4$) | 5,310 g |

The homogeneous mixture is melted in a quartz crucible or in a continuously operating melting tank with quartz melting unit at between 1,220° and 1,300° C. After a subsequent refining step of several hours at temperatures of between 1,300° and 1,350° C., the melt is homogenized with a Pt stirrer. The bubble-free melt is then further homogenized without schlieren with the stirrer while cooling to 1,250° C., poured into a mold at 1,180°–1,210° C., and uniformly tempered down to room temperature at about 530° C. in a cooling furnace.

In Table 5 below are listed a number of preferred glass compositions (in % by weight) which have been made according to the present invention.

TABLE 5

|  | 1 | 2 | 3 | 4 |
|---|---|---|---|---|
| $SiO_2$ | 46.8 | 46.896 | 45.4988 | 52.4985 |
| PbO | 33.05 | 30.10 | 33.0 | 24.4 |
| $Li_2O$ | 0.30 | 0.30 | 0.35 | 2.40 |
| $Na_2O$ | — | 0.70 | 0.65 | 2.00 |
| $K_2O$ | 17.80 | 17.60 | 18.50 | 16.50 |
| F | 0.20 | 0.20 | — | 0.30 |
| $CeO_2$ | 1.80 | 1.20 | 2.00 | 1.90 |
| $Gd_2O_3$ | 0.05 | 0.004 | 0.0012 | 0.0015 |
| $B_2O_3$ | — | 3.0 | — |  |

The glass compositions of all the tables contain no mention of MgO, CaO, SrO, BaO, ZnO and CdO and all have a high resistance to electrical discharge and suitable transmission properties.

The preceding examples can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Radiation-shielding glasses absorbing gamma and X-ray radiation and neutron radiation with a resistance to electrical discharge of $>5 \times 10^8$ rad with respect to high-energy radiation in the glass system (quantitative data in % by weight) of:

| $SiO_2$ | 35–56 |  |
|---|---|---|
| PbO | 24–46 |  |
| $Li_2O$ | 0–2.5 |  |
| $Na_2O$ | 0–4 |  |
| $K_2O$ | 15.1–21 | } $\Sigma = 15.1$–21 |
| $Cs_2O$ | 0–5 |  |
| $CeO_2$ | 0.5–2.5 |  |
| CuO | } 0–0.05 |  |
| $Fe_2O_3$ |  |  | and $SiO_2$ being replaced in the glasses in an amount of 2–10% by weight of the sum of $B_2O_3$ and $Gd_2O_3$, with the provisions that at least 35% of $SiO_2$ is present in the glass, and $Gd_2O_3$ is present in an amount effective to contribute to said resistance.

2. Glasses according to claim 1, further comprising not more than 2.4% by weight of the isotope $Li^6$ in the form of $(Li^6)_2O$.

3. Glasses according to claim 1, further comprising refining agents $As_2O_3$ and/or $Sb_2O_3$, halogens F and/or Cl, and sulfates in quantities of up to 0.5% by weight.

4. A radiation-shielding window structure wherein at least a part of at least one pane comprises a glass according to claim 1.

5. A radiation-shielding window structure wherein at least a part of at least one pane comprises a glass according to claim 2.

6. A radiation-shielding window structure wherein at least a part of at least one pane comprises a glass according to claim 3.

7. Glasses according to claim 1, wherein the sum of $B_2O_3$ and $Gd_2O_3$ is 3–8%.

8. Glasses according to claim 1, wherein $B_2O_3$ is present in an amount of 1–10%.

9. Glasses according to claim 1, wherein $Gd_2O_3$ is present in an amount of 1–10%.

10. Glasses according to claim 1, wherein $B_2O_3$ is present in an amount of 2–7.00%.

11. Glasses according to claim 1, wherein $Gd_2O_3$ is present in an amount of 2–7.50%.

12. Glasses according to claim 7, wherein $B_2O_3$ is present in an amount of 2–7.00%.

13. Glasses according to claim 7, wherein $Gd_2O_3$ is present in an amount of 2–7.50%.

14. A radiation-shielding window structure, wherein at least a part of at least one pane comprises a glass according to claim 7.

15. A radiation-shielding window structure, wherein at least a part of at least one pane comprises a glass according to claim 8.

16. A radiation-shielding window structure, wherein at least a part of at least one pane comprises a glass according to claim 9.

17. A radiation-shielding window structure, wherein at least a part of at least one pane comprises a glass according to claim 10.

18. A radiation-shielding window structure, wherein at least a part of at least one pane comprises a glass according to claim 11.

19. A wall mountable radiation shielding window having a high absorption coefficient for high energy X-ray and gamma radiation with a resistance to electrical discharge of greater than $5 \times 10^8$ rad with respect to high-energy radiation comprising at least one pane wherein at least a part of the window comprises a glass containing, in percent by weight, of:

| $SiO_2$ | 35–56 |  |
|---|---|---|
| PbO | 24–46 |  |
| $Li_2O$ | 0–2.5 |  |
| $Na_2O$ | 0–4 |  |
| $K_2O$ | 7–21 | } $\Sigma = 12$–21 |
| $Cs_2O$ | 0–5 |  |
| $CeO_2$ | 0.5–2.5 |  |
| $Gd_2O_3$ |  | > 10 ppm |
| $CuO + FeO_3$ | 0–0.05 |  | and a mounting for supporting the at least one pane in a wall.

20. A radiation shielding window of claim 19, comprising at least two layers of glass.

21. A radiation shielding window of claim 20, comprising 2 to 8 layers of glass.

22. A radiation shielding window of claim 19, wherein the area of the window is at least about 600 mm × 500 mm to about 1200 mm × 1200 mm.

23. A radiation shielding window of claim 19, wherein the thickness of at least one layer is at about 30 mm to 1200 mm.

24. A radiation shielding window according to claim 19, having further resistance to neutron radiation and for the absorption of neutrons, $SiO_2$ is replaced in the glass in an amount of 2–10% by weight of the sum of $B_2O_3$ and $Gd_2O_3$ with the proviso that at least 35% of $SiO_2$ is present in the glass.

25. A radiation shielding window of claim 24, comprising at least two layers of glass.

26. A radiation shielding window of claim 24, comprising 2 to 8 layers of glass.

27. A radiation shielding window of claim 24, wherein the area of the window is at least about 600 mm×500 mm to about 1200 mm×1200 mm.

28. A radiation shielding window of claim 24, wherein the thickness of at least one layer is at least about 30 mm to 1200 mm.

29. Radiation-shielding glasses absorbing gamma and X-ray radiation and neutron radiation with a resistance to electrical discharge of greater than $5\times10^8$ rad with respect to high energy radiation in the glass system (quantitative data in % by weight) of:

| | | |
|---|---|---|
| $SiO_2$ | 35–56 | |
| PbO | 24–46 | |
| $Li_2O$ | 0–2.5 | |
| $Na_2O$ | 0–4 | |
| $K_2O$ | 15.1–21 | $\Sigma = 15.1–21$ |
| $Cs_2O$ | 0–5 | |
| $CeO_2$ | 0.5–2.5 | |
| CuO | 0–0.05 | |
| $Fe_2O_3$ | | | the glasses are free from MgO, CaO, SrO, BaO, ZnO, CdO, $SiO_2$ is replaced in the glasses in an amount of up to 10% by weight of the sum of $B_2O_3$ and $Gd_2O_3$, with the provision that at least 35% of $SiO_2$ and at least 10 ppm $Gd_2O_3$ are present in the glass.

30. Glasses according to claim 29, wherein $Gd_2O_3$ is in the range from 0.001 to 1.5 wt %.

31. Glasses according to claim 29, wherein $Gd_2O_3$ is in the range from 0.004 to 0.25 wt %.

32. Glasses according to claim 29, wherein the glasses are free from $Al_2O_3$.

33. A wall mountable radiation shielding window having a high absorption coefficient for high energy X-ray and gamma radiation with a resistance of electrical discharge greater than $5\times10^8$ rad with respect to high-energy radiation in the glass system comprising at least one pane wherein at least a part of the window comprises a glass containing, in percent by weight, of:

| | |
|---|---|
| $SiO_2$ | 35–56 |
| PbO | 24–46 |
| $Li_2O$ | 0–2.5 |
| $Na_2O$ | 0–4 |
| $K_2O$ | 15.1–21 |
| $Cs_2O$ | 0–5 |
| $CeO_2$ | 0.5–2.5 |
| $CuO + F_2O_3$ | 0–0.05 |
| $Gd_2O_3$ | 0.001–1.5 |
| $B_2O_3$ | 0–10 |
| $SiO_2 + B_2O_3 + Gd_2O_3$ | 35.001–56 | the glass being free of MgO, CaO, SrO, BaO, ZnO, CdO, with the sum of $Na_2O$, $K_2O$ and $Cs_2O$ being 12–21 percent by weight, and a mounting for supporting the at least one pane in a wall.

34. Radiation-shielding window according to claim 33, wherein the glass is free of $Al_2O_3$.

* * * * *